Patented June 23, 1942

2,287,683

UNITED STATES PATENT OFFICE 2,287,683

PURIFICATION OF PHOSPHORIC ACID

Rudolph J. Hurka, Anniston, Ala., assignor to Monsanto Chemical Company, a corporation of Delaware No Drawing. Application February 23, 1940, Serial No. 320,416

12 Claims. (Cl. 23—165)

This invention relates to the treatment of phosphoric acid and has for its object the provision of a process by which arsenic present therein, may be removed substantially completely. The herein disclosed process is particularly adapted to the treatment of high concentration phosphoric acids, that is those strong acids, which because of their high viscosity, cannot be treated by the ordinary hydrogen sulfide process.

The present process is also applicable to the treatment of ordinary 75% or 80% $H_3PO_4$ (orthophosphoric acid) which acids represent the ordinary ranges of commercial phosphoric acid; however these acids are customarily more readily treated for arsenic removal by saturation with hydrogen sulphide gas followed by filtration to remove the arsenic sulfide precipitate.

For acids of concentrations ranging upwardly above say 80% $H_3PO_4$ (57.5% $P_2O_5$), the viscosity of the acid rapidly increases and filtration difficulties increase with increasing concentrations to the point where the viscosity is so high even at practical elevated temperatures as to make it impossible to completely remove arsenic by the precipitation process as the sulphide.

I have now found that arsenic as it occurs in phosphoric acid can be removed substantially completely by contacting the acid with a metallic copper mass having an extended surface whereupon the arsenic combines with the copper. Such a combination of arsenic with copper probably results in the formation of a copper arsenide of the formula $Cu_3As_2$, however I am uncertain as to the exact composition of the reaction product. I have found, however, that the combination of copper and arsenic is extraordinarily stable in strong phosphoric acid solutions since, when properly operated the process results in an elimination of over 98% of the contained arsenic, while values showing an elimination of 99.8% are not uncommon. When pure phosphoric acid of high strength, that is, between 72% $P_2O_5$ and 84% $P_2O_5$ is treated by my process a slight red coloration may be produced in the treated acid. I have found that the formation of the red coloration can be prevented by the addition of small amounts of hydrochloric acid to the phosphoric acid. Amounts of under 0.2% or 0.1% to as little as 0.01% or less are sufficient to prevent the dissolution of copper into the acid.

I have found that it is necessary that oxygen containing gases in excessive amount be excluded during the carrying out of the process herein described, otherwise oxidation of the copper will occur and the copper oxide will then dissolve in the acid.

When treating the weaker grades of acid by my process, the operation should be carried out at somewhat elevated temperatures, that is temperatures of say 50° C. to 80° C. When treating the more concentrated acids it is desirable to employ temperatures somewhat higher, for example in the case of tetraphosphoric acid ($H_6P_4O_{13}$) containing from 82% to 84% $P_2O_5$, temperatures of 100° C. to 120° C. are desirable with a preferred temperature in the neighborhood of 105° C.

In carrying out my process, an acid resisting vessel, which may be of copper or any suitable metal lined with copper is packed with a pure copper mass of extended surface. Copper turnings are satisfactory, however I prefer thin copper foil which has previously been formed into narrow thin ribbons and woven or braided into spongelike bodies of great surface. Such copper products will possess an estimated surface of from 25 to 50 or more sq. cms. per gram of mass, and can readily be obtained upon the market in suitable form. It is generally known as copper textile material.

As an example of the operation of my process, a tetraphosphoric acid containing between 82% and 84% $P_2O_5$ and 20 to 40 P. P. M. of arsenic as $As_2O_3$ and to which was added 0.01% HCl, was passed, at a temperature of 105° C., thru two copper containers in series, each container being packed with copper foil sponge, the flow being at such a rate that 35 to 50 lbs. of acid is passed per day per pound of copper, which copper had a surface of 50 sq. cms. per gram. The acid obtained contained less than 0.5 P. P. M. of arsenic ($As_2O_3$) much of the product ranging between 0.1 P. P. M. and 0.2 P. P. M. $As_2O_3$. Copper was present in treated acid in amount under 1 P. P. M. however since the acid originally contains somewhat under 1 P. P. M. of copper, it is believed that the copper picked up during my process is negligible or else of so minute an amount as to be safely ignored.

During the operation of my process the copper surface becomes coated with a black deposit. After long continued use the black coating becomes dislodged or broken off and black particles are found in the treated acid. Since these black particles are relatively large they may be removed by filtering the acid thru a sand filter or other coarse filter. Because of this fact it is possible to operate continuously without regeneration of the copper and to continue operation as long as the copper is substantially undiminished in surface area.

On the other hand, should it be undesirable to filter the black copper arsenide particles from the acid, the copper mass may be removed from the treating chambers and cleaned of black deposit by an electrolytic process, carried out as follows:

To clean the copper mass and remove the arsenic coating therefrom, the copper after removing adhering acid by means of a water wash, is suspended in an aqueous 1% ammonia solution by means of an electrical conductor which is connected to the positive pole of a direct current source. A graphite or other carbonaceous electrode is also immersed in the same solution and connected to the negative pole of the current. By electrolysis the black coating is transferred from the copper to the graphite surface from which it can readily be removed by scraping or brushing. The copper mass again becomes bright and is thus available for further service as described.

As previously stated the copper mass during operation should be maintained free of oxide which is accomplished by excluding air or other oxygen containing gases from the system. During operation there is a very slow evolution of gas at the surface of the copper. The gas liberated has not been identified but it is believed to be oxygen since in the reaction of $As_2O_3$ with copper to form $Cu_3As_2$, oxygen would be released. It is quite possible that the hydrochloric acid present in the phosphoric acid while in contact with the copper surface has a specific effect in rendering the gas inert as far as oxidation of the copper is concerned. This, however is only a theory advanced to explain the chemistry of my process and consequently may not be entirely correct.

Phosphoric acids which may be treated by my process range preferably from a lower concentration of 75% or 80% $H_3PO_4$ content (54.3% $P_2O_5$ to 58% $P_2O_5$ respectively) through the anhydrous phosphoric acid 100% $H_3PO_4$ (72.5% $P_2O_5$) to the polyphosphoric acids of concentrations ranging upwardly to 113% to 116% equivalent $H_3PO_4$ (82% to 84% $P_2O_5$) concentration and even as high as metaphosphoric acid. Such acids in the higher range of concentrations (upwardly from 100% to 116% equivalent $H_3PO_4$ or in the case of metaphosphoric acid to 122.7% equivalent $H_3PO_4$ content concentration) are quite viscous at a room temperature of 25° C. but are still flowable. At higher temperatures within the range of 100° C., to 200° C. or even 300° C. the viscosity decreases markedly and the acids are consequently more readily flowable. For example while tetraphosphoric acid of concentration say between 113% and 116% equivalent $H_3PO_4$ may be treated at 100° C. to 120° C., the metaphosphoric acid containing 88.8% to 89.0% $P_2O_5$ will require temperatures of from 150° C. to 300° C. for successful treatment.

The efficiency of arsenic removal by my process is dependent upon a weight-surface factor when operating at a particular temperature. This is illustrated by the following results:

A copper lined receptacle containing a copper textile mass having an estimated surface area of 245,000 sq. cm. was maintained at a temperature of 105° C. and acid passed through the receptacle at the rate of 3 to 3.5 lbs. of $P_2O_5$ as a phosphoric acid having a strength of 82%–84% $P_2O_5$ per hour. The acid contained 0.2% to 0.1 HCl. The experiment lasted continuously for 27 days. During this time the treated acid obtained contained less than 0.5 P. P. M. of arsenic ($As_2O_3$) and in most samples the arsenic content was 0.1 to 0.2 P. P. M. of $As_2O_3$. The original acid contained from 30 to 40 P. P. M. of $As_2O_3$.

These conditions calculate to a weight-surface relationship of from 81,666 sq. cm. to 70,000 sq. cm. of copper surface per pound of $P_2O_5$ per hour for a tetraphosphoric acid for substantially complete removal of arsenic. By increasing the acid flow to 7 lbs. of $P_2O_5$ in the same receptacle, the arsenic content will be in the neighborhood of 1 P. P. M. This flow rate corresponds to 35,000 sq. cm. of copper surface per pound of $P_2O_5$ per hour for a removal of from 96.5% to 97.5%. At higher rates of flow the arsenic removal would be somewhat less effective.

Having now particularly described my invention, what I claim is:

1. The process of removing arsenic from phosphoric acid substantially completely comprising flowing a liquid, arsenic bearing, phosphoric acid containing from 0.1% to 0.01% of hydrochloric acid, HCl, over a copper surface, at such a rate as to substantially completely deposit said arsenic upon said copper surface.

2. The process of removing arsenic contained in phosphoric acid of concentration between 80% $H_3PO_4$ and 116% equivalent $H_3PO_4$, and also containing between 0.1% and 0.01% hydrochloric acid (HCl), comprising contacting said acid with a copper surface to effect a deposition of arsenic compound on said copper surface.

3. The process of removing arsenic contained in phosphoric acid of concentration between 80% $H_3PO_4$ and 116% equivalent $H_3PO_4$ comprising adding to said acid a minor percentage of hydrochloric acid and then contacting said phosphoric acid mixed with hydrochloric acid with a copper surface to effect a deposition of arsenic on said surface.

4. The process of removing arsenic contained in phosphoric acid of concentration between 80% $H_3PO_4$ and 116% equivalent $H_3PO_4$ comprising adding to said acid between 0.1% and 0.01% of HCl and then contacting said phosphoric acid at a temperature above 25° C. with a copper surface to effect a deposition of arsenic thereon.

5. The process of removing arsenic contained in phosphoric acid comprising adding to said acid from 0.2% to 0.01% of hydrochloric acid (HCl) and then contacting said acid with a copper mass of extended surface to effect a deposition of arsenic upon said surface, removing said copper mass from said acid, electrolyzing said copper mass, to remove said deposit and again contacting arsenic containing acid with said copper mass.

6. The process defined in claim 5 in which the step of electrolyzing the copper mass is effected in dilute aqueous ammonia solution.

7. The process defined in claim 5 in which the step of electrolyzing the copper mass is effected in an electrolyte, the said copper mass functioning as the anode and a carbonaceous electrode functioning as a cathode.

8. The process of removing arsenic contained in phosphoric acid of concentration approximating that of commercial tetraphosphoric acid comprising flowing said acid over a copper mass of extended surface at such a rate that the weight-surface relationship of the acid and the copper surface is between the limits of 81,666 sq. cm. to 35,000 sq. cm. of copper surface per pound of $P_2O_5$ in said acid per hour.

9. The process described in claim 8 in which the acid is flowed over the copper surface while at a temperature of between 120° C. to 100° C.

10. The process described in claim 8 in which the acid is flowed over the copper surface at a weight-surface relationship within the limits of from 81,666 sq. cm. to 70,000 sq. cm. per pound of $P_2O_5$ per hour.

11. The process of removing arsenic contained in a phosphoric acid of concentration between 72% and 84% $P_2O_5$ and also containing less than 0.2% of hydrochloric acid (HCl) comprising flowing said acid over a copper textile material, said material providing an extended copper surface, said acid being flowed over said copper textile material at such a rate that the weight-surface relationship of said acid and said copper surface is between the limits of 81,666 sq. cm. to 35,000 sq. cm. of copper surface per pound of $P_2O_5$ in said acid per hour.

12. The process of removing small amounts of arsenic from phosphoric acid comprising flowing said acid containing said arsenic and also containing from 0.2% to 0.01% of hydrochloric acid (HCl), over a copper surface, while in the substantial absence of free oxygen and at such a rate as to substantially completely deposit said arsenic upon said copper surface.

RUDOLPH J. HURKA.